United States Patent [19]

Kubota et al.

[11] Patent Number: 4,684,680
[45] Date of Patent: Aug. 4, 1987

[54] THERMOSETTING SYNTHETIC RESIN LACQUER COMPOSITIONS HAVING IMPROVED LIGHT STABILITY

[75] Inventors: Naohiro Kubota, Ageo; Toshihiro Shibata, Omiya; Atsushi Nishimura, Washinomiya, all of Japan

[73] Assignee: Adeka Argus Chemical Co., Ltd., Tokyo, Japan

[21] Appl. No.: 795,309

[22] Filed: Nov. 6, 1985

[30] Foreign Application Priority Data

Nov. 7, 1984 [JP] Japan .................. 59-234372

[51] Int. Cl.$^4$ .............................. C08K 5/34
[52] U.S. Cl. ........................ 524/91; 524/100
[58] Field of Search .......................... 524/91

[56] References Cited

U.S. PATENT DOCUMENTS

| | | | |
|---|---|---|---|
| 3,936,305 | 2/1976 | Hiraishi et al. | 548/260 |
| 4,085,089 | 4/1978 | Irick, Jr. et al. | 524/91 |
| 4,315,848 | 2/1982 | Dexter et al. | 524/91 |
| 4,426,471 | 1/1984 | Berner | 524/91 |

OTHER PUBLICATIONS

*Chemical Abstracts*, 77 62720h (1972).

*Primary Examiner*—John Kight
*Assistant Examiner*—Kriellion Morgan

[57] ABSTRACT

Thermosetting synthetic resin lacquer compositions having improved light stability are provided comprising a thermosetting synthetic resin and an alkylidene bis(-benzotriazolyl phenol) having the formula (I):

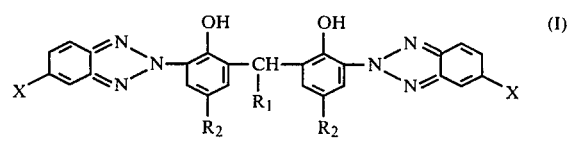

wherein:
- $R_1$ is hydrogen or alkyl having from one to about twelve carbon atoms;
- $R_2$ is alkyl having from one to about twelve carbon atoms or arylalkyl having from seven to about sixteen carbon atoms;
- X is selected from the group consisting of hydrogen, halogen, alkyl having from one to about twelve carbon atoms, aryl having from six to ten carbon atoms, arylalkyl having from seven to about sixteen carbon atoms, alkoxy having from one to about twelve carbon atoms, aryloxy having from six to ten carbon atoms; and arylalkoxy having from seven to about sixteen carbon atoms.

24 Claims, No Drawings

THERMOSETTING SYNTHETIC RESIN LACQUER COMPOSITIONS HAVING IMPROVED LIGHT STABILITY

Lacquer coatings are subject to degradation upon exposure to ultraviolet light, and display cracking, discoloration and decreased reflectance. Since lacquers and finishes especially for use in automotive finishes must have high weatherability, light stabilizers are required.

However, the conventional light stabilizers are unsatisfactory in stabilizing effect, and are subject to extraction when the coating or finish is exposed to water, while some conventional stabilizers impart color to the coatings. For example benzophenone-type UV absorbers impart color to the coatings, although they absorb UV light of from 290 to 420 m$\mu$. Salicylate-type UV absorbers are unsatisfactory in stabilizing effect, and benzotriazole-type UV absorbers lack solubility in lacquer solvents and resins, and are easily extracted from coatings and finishes.

U.S. Pat. No. 3,936,305, patented Feb. 3, 1976, to Hiraishi, Futaki, Horii and Yamashita, discloses that compounds represented by the following general formula are extremely effective as ultraviolet ray-absorbing agents, especially for color photographic photosensitive materials:

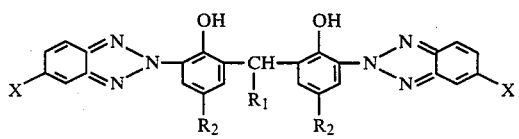

wherein $R_1$ is an alkyl group having 1 to 13, preferably 5 to 13 carbon atoms, $R_2$ is an alkyl group having 1 to 18 carbon atoms and X is hydrogen, a halogen, an alkyl, an alkoxy, an aryloxy, an aralkyloxy or an aryl group.

The patentees note that hydroxy benzotriazole is known as an excellent ultraviolet ray-absorbing agent, but gives solubility problems, crystallizing out in the amounts needed for adequate protection. The alkylidene-bis-benzotriazolylphenols are more soluble, and in addition cause no discoloration and are not colored themselves, when used in photosensitive gelatin or other hydrophilic protective colloid compositions.

Various 2,2,6,6-tetraalkylpiperidine compounds have been suggested for use in finishes and lacquer systems.

Japan Kokai Nos. 52-22-29 (2/1977), 52-51427 (4/1977), 54 88935 (7/1979) and 55-69670 (5/1980) suggest use of 1 unsubstituted 2,2,6,6-tetramethylpiperidine compounds in acrylic lacquers.

Berner U.S. Pat. No. 4,314,933 suggests the use of 2,2,6,6-tetramethylpiperidine compounds in various kinds of finishes and lacquers.

Berner, U.S. Pat. Nos. 4,344,876, patented Aug. 17, 1982, 4,426,471 and 4,426,472, patented Jan. 17, 1984, proposes the stabilization of acid-catalysed stoving lacquers based on hot crosslinkable acrylic, polyester or alkyl resins against the action of light and moisture by the addition of N-substituted polyalkylpiperidine derivatives, which contain a group of the formula (I)

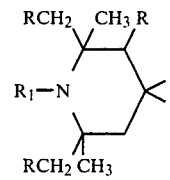

or polymers, the recurring structural units of which contain a group of the formula I or are linked through a bivalent group corresponding to the formula I, wherein $R_1$ represents a free valency, and otherwise R represents hydrogen or methyl and $R_1$ represents $C_1$-$C_{18}$ alkyl, $C_1$-$C_6$ hydroxyalkyl, $C_3$-$C_8$ alkenyl, $C_3$-$C_8$ alkynyl, $C_7$-$C_{12}$ aralkyl which is unsubstituted or substituted in the alkyl moiety by hydroxyl, or $C_1$-$C_8$ alkanoyl or $C_3$-$C_5$ alkenoyl.

Preferred N-substituted polyalkylpiperidine compounds are compounds or polymers which contain a group of the formula (I), wherein R is hydrogen and $R_1$ represents $C_1$-$C_8$ alkanoyl or $C_3$-$C_5$ alkenoyl.

2,2'-Methylene-bis-(4-hydrocarbyl-6-benzotriazolylphenols) are known light stabilizers for plastics, and a process for preparing them is disclosed in Chemical Abstracts 74 53666f (1971) and 77 62720h (1972).

In accordance with this invention, thermosetting synthetic resin lacquer compositions are provided having an improved resistance to degradation when exposed to light, and comprising an alkylidene bis(benzotriazolylphenol) having Formula I:

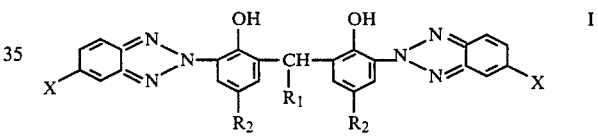

wherein:
$R_1$ is hydrogen or alkyl having from one to about twelve carbon atoms;
$R_2$ is alkyl having from one to about twelve carbon atoms or arylalkyl having from seven to about sixteen carbon atoms;
X is selected from the group consisting of hydrogen, halogen, alkyl having from one to about twelve carbon atoms, aryl having from six to ten carbon atoms, arylalkyl having from seven to about sixteen carbon atoms, alkoxy having from one to about twelve carbon atoms, aryloxy having from six to ten carbon atoms; and arylalkoxy having from seven to about sixteen carbon atoms.

Exemplary alkyl represented by $R_1$ and $R_2$ and X include methyl, ethyl, propyl, isopropyl, butyl, isobutyl, sec-butyl, t-butyl, amyl, t-amyl, hexyl, heptyl, octyl, 2-ethylhexyl, isooctyl, 1,1,3,3-tetramethylbutyl, nonyl, decyl, undecyl and dodecyl.

Exemplary arylalkyl represented by $R_2$ and X include benzyl, α-methylbenzyl, α-ethylbenzyl, p-ethylbenzyl, cumyl, phenethyl, phenpropyl, phenbutyl, phenoctyl, phendodecyl, and phenhexyl.

Halogen represented by X include chlorine, bromine, iodine and fluorine.

Exemplary and preferred alkylidene-bis-(benzotriazolylphenol) compounds of this invention are shown below:

1. 2,2'-Methylenebis(4-methyl-6-benzotriazolylphenol)

2. 2,2'-Methylenebis(4-(1,1,3,3-tetramethylbutyl)-6-benzotriazolylphenol))
3. 2,2'-Methylenebis(4-cumyl-6-benzotriazolylphenol)
4. 2,2'-Octylidenebis(4-methyl-(5'-methylbenzotriazolyl)phenol)
5. 2,2'-Octylidenebis(4-methyl-(5'-chlorobenzotriazolyl)phenol)

The alkylidene-bis-benzotriazolyl-phenols can be prepared by:

(1) reacting a 4-hydrocarbyl-6-benzotriazolyl phenol having the formula I:

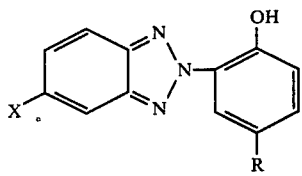

with an amine $HNR_1R_2$ and formaldehyde in an organic solvent to produce a Mannich base having formula II:

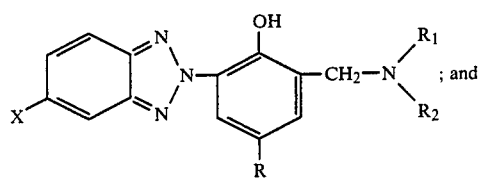

(2) reacting the Mannich base with itself or a 4-hydrocarbyl-6-benzotriazolyl phenol having formula I, thereby forming a 2,2'-methylene-bis-(4-hydrocarbyl-6-benzotriazolyl-phenol.

The following Examples represent preferred embodiments of the process.

EXAMPLE 1

Preparation of 2,2'-methylene-bis-(4-methyl-6-benzotriazolyl-phenol)

4-Methyl-6-benzotriazolyl-phenol 225 g, diethylamine 110 g, and paraformaldehyde 51.8 g were dissolved in 250 ml of butanol, and heated with stirring at reflux temperature (95° C. to 105° C.) for 24 hours. The solvent was vacuum distilled off, and 308 g of 2-diethylaminomethyl-4-methyl-6-benzotriazolyl-phenol Mannich base was obtained as residue. (Yield=99%)

This Mannich base, 7.8 g, was dissolved in 20 ml of xylene, and sodium methylate (28% methanol solution) 0.15 g was added. The solution was heated with stirring under reflux at 140° C. to 150° C. for 10 hours while a nitrogen stream was passed through the reaction mixture. The solvent was vacuum distilled off, and 6.1 g of crude product was obtained as residue. (Purity=91%; Yield=96%).

The crude product was recrystallized from xylene, and a pale yellow powder, 2,2'-methylene-bis-(4-methyl-6-benzotriazolylphenol melting at 285° C. was obtained.

EXAMPLE 2

Preparation of 2,2'-methylene-bis-(4-methyl-6-benzotriazolyl-phenol)

6.2 g of the Mannich base obtained in Example 1 and 4-methyl-6-benzotriazolyl-phenol 4.5 g were dissolved in 200 ml of xylene, and sodium methylate (28% methanol solution) 0.2 g was added. The solution was heated with stirring under reflux at 140°-150° C. for 10 hours with a stream of nitrogen. After distilling of the solvent, and recrystallizing the residue from xylene, the desired product 2,2'-methylene-bis-(4-methyl-6-benzotriazolyl-phenol) was obtained in 95% yield.

EXAMPLE 3

Preparation of 2,2'-methylene-bis-(4-(1,1,3,3-tetramethyl)butyl-6-benzotriazolyl-phenol)

2-Diethylaminomethyl-4-(1,1,3,3-tetramethyl)butyl-6-benzotriazolyl-phenol Mannich base was prepared using 4-(1,1,3,3-tetramethyl)butyl-6-benzotriazolyl-phenol by the same procedure as in Example 1. This Mannich base 37 g and 4-(1,1,3,3-tetramethyl)butyl-6-benzotriazolyl-phenol 25 g were dissolved in 60 ml of xylene, and sodium methylate (28% methanol solution) 3.1 g was added. The solution was heated with stirring under reflux at 140°-150° C. for 10 hours with a stream of nitrogen. After distilling of the solvent, and recrystallizing the residue from xylene, 55.2 g of the crude product was obtained. (Purity=93%; Yield=93%).

The crude product was recrystallized from n-heptane, and a white powder, 2,2'-methylene-bis-4-(1,1,3,3-tetramethyl)butyl-6-benzotriazolyl-phenol, melting at 200° C. was obtained.

EXAMPLE 4

Preparation of 2,2'-methylene-bis-(4-cumyl-6-benzotriazolyl-phenol)

2-Diethylaminomethyl-4-cumyl-6-benzotriazolyl-phenol Mannich base was prepared using 4-cumyl-6-benzotriazolyl-phenol by the same procedure as in Example 1. This Mannich base 10.0 g and 4-cumyl-6-benzotriazolyl-phenol 6.6 g were dissolved in 60 ml of xylene, and sodium methylate (28% methanol solution) 3.1 g was added. A white crystalline product, 2,2'-methylene-bis-(4-cumyl-6-benzotriazolyl-phenol) melting at 190° C. was obtained. (Yield=93%).

EXAMPLE 5

Preparation of 2,2'-methylene-bis-(4-methyl-6-benzotriazolyl-phenol)

31.0 g of the Mannich base obtained in Example 1 and methyl iodide 30 g were dissolved in 100 g of ethanol, and heated with stirring at reflux temperature (60° C. to 75° C.) for 24 hours. The solvent was distilled off, and the pale yellow crystalline product (methyl-diethyl-2-hydroxy-3-benzotriazolyl-5-methylbenzylammonium iodide) was obtained by recrystallization from ethanol.

This product 9.0 g and sodium methylate (28% methanol solution) 4.0 g were dissolved in 40 g of butoxyethoxyethanol, and heated with stirring at reflux temperature (160° C. to 170° C.) for 10 hours while a nitrogen stream was passed through the reaction mixture. The solvent was vacuum distilled off, and 6.1 g of crude product was obtained as residue. (Purity=91%; Yield=96%).

The crude product was recrystallized from xylene and the desired product, 2,2'-methylene-bis-(4-methyl-6-benzotriazolylphenol) was obtained in 95% yield.

The amount of alkylidenebis(benzotriazolylphenol) compound is 0.001 to 10 parts by weight, preferably 0.01 to 5 parts by weight based on the solvent free binder.

The acrylic resin lacquers which can be stabilized against the action of light are conventional acrylic resin stoving lacquers, which are described, for example, in H. Kittel's "Lehrbuch der Lacke and Beschichtungen", Vol. 1, Part 2, on pages 735 and 742 (Berlin 1972), and in "Lackkunstharze" (1977), by H. Wagner and H. F. Sarx, on pages 229–238.

The polyester lacquers which can be stabilized against the action of light are conventional stoving lacquers, such as are described in H. Wagner and H. F. Sarx, op. cit., on pages 86–99.

The alkyd resin lacquers which can be stabilized against the action of light are conventional stoving lacquers which are used in particular for coating automobiles (automobile finishing lacquers), for example lacquers based on alkyd/melamine resins and alkyd/acrylic/melamine resins (see H. Wagner and H. F. Sarx, op. cit., pages 99–123).

The acid-catalysed stoving lacquers stabilized in accordance with the invention are suitable both for metal finish coatings and solid shade finishes, especially in the case of retouching finishes. The lacquers stabilized in accordance with the invention are preferably applied in the conventional manner by two methods, either by the single-coat method or by the two-coat method. In the latter method, the pigment-containing coat is applied first and then a covering coat of clear lacquer over it.

The lacquers can be dissolved or dispersed in the customary organic solvents, or in water, or can be solvent-free.

When used in two-coat finishes, the alkylidene bis(-benzotriazolyl phenols) as can incorporated either only in the unpigmented finishing lacquer or both in the unpigmented finishing lacquer and in the pigmented priming lacquer.

To obtain maximum light stability, the concurrent use of other conventional light stabilizers can be advantageous. Examples are UV absorbers of the benzophenone type, such as 2-hydroxy-4-methoxyabenzophenone, 2-hydroxy-4-n-octoxybenzophenone, 2,2'-dihydroxy-4-methoxybenzophenone and 2,4-dihydroxybenzophenone, UV absorbers of the benzotriazole type, such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-bis-(α,α-dimethylbenzyl)phenyl)benzotriazole, 2-(2'-hydroxy-3',5'-di-t-amylphenyl)benzotriazole, 2-(2'-hydroxy-5'-t-octylphenyl)benzotriazole and 2-(2'-hydroxy-5'-methylphenyl)benzotriazole; UV absorbers of the benzoate type, such as phenylsalicylate, 2,4-di-t-butylphenyl-3,5-di-t-butyl-4-hydroxybenzoate and hexadecyl-3,5-di-t-butyl-4-hydroxybenzoate; UV absorbers of the acrylate type, such as α-cyano-β-methyl-β-(p-methoxyphenyl)acrylic acid methyl ester, and UV absorbers of the oxanilide type, such as N-2-ethylphenyl-N'-2-ethoxy-5-t-butylphenyloxamide and N-2-ethylphenyl-N'-2-ethoxyphenyloxamide.

If such compounds are employed, the amount is within the range from about 0.001 to about 5 parts by weight of the thermosetting resin.

The lacquers can contain other conventional ingredients, such as antioxidants, plasticizers, levelling assistants, hardening catalysts, thickeners, dispersants, pigments, and dyes.

The following Examples represent preferred embodiments of thermosetting synthetic resin lacquers containing alkylidenebis(benzotriazolylphenol) compounds.

EXAMPLES 1 TO 5

The effect of the stabilizer in two-coat metallic effect finishes comprising metallic effect priming lacquer and unpigmented finishing lacquer was determined.

(a) Metallic effect priming lacquer

Methyl methacrylate 100 g, n-butyl acrylate 66 g, 2-hydroxyethyl methacrylate 30 g, methacrylic acid 4 g, xylene 80 g and n-butanol 20 g were heated and stirred at 110° C. and then a solution of azo-bis-(isobutylronitrile) 2 g, dodecyl mercaptan 0.5 g, xylene 80 g and n-butanol 20 g was added dropwise, over three hours. The solution was stirred an additional two hours at 110° C., thus obtaining an acrylic resin solution.

This acrylic resin solution 12 parts was blended with butoxylated methylol melamine (Mitsui Toatsu Co., Yuban 20 SE60; solids content 60%) 2.5 parts, cellulose acetobutyrate (20% butylacetate solution) 50 parts, aluminum pigment (Toyo Aluminum Co., Alpaste 1123N) 5.5 parts, xylene 10 parts, butyl acetate 20 parts and copper phthalocyanine blue 0.2 part.

(b) Unpigmented finishing lacquer

The above acrylic resin solution 48 parts was blended with butoxylated methylolmelamine 10 parts, xylene 10 parts, butoxyethylacetate 4 parts and stabilizer as shown in Table I, 0.15 part.

Pieces of steel sheeting, which were coated with a primer, were first coated with the priming lacquer, and subsequently with the finishing lacquer. The priming lacquer was sprayed on to a thickness of about 20μ, and aired for 10 minutes. Then the clear lacquer was sprayed on, to a thickness of about 30μ. After being aired 15 minutes, the samples were stoved for 30 minutes at 140° C.

The coated sheets were exposed to ultraviolet light in a Weather-O-Meter. The time in hours when degradation set in, as determined by cracking on the surface of the sheet, was noted as hours to failure, and the results are shown in Table I.

TABLE I

| Example No. | Stabilizer | Hours to Failure |
|---|---|---|
| Control 1 | None | 1600 |
| Control 2 | 2-(2-Hydroxy-5-methyl-phenyl)benzotriazole | 1800 |
| Control 3 | 2-(2-Hydroxy-3,5-dicumylphenyl)benzotriazole | 2100 |
| Example 1 | 2,2'-Methylenebis(4-methyl-6-benzotriazolylphenol) | 2600 |
| Example 2 | 2,2'-Methylenebis(4-(1,1,3,3-tetramethylbutyl)-6-benzotriazolylphenol)) | 2800 |
| Example 3 | 2,2'-Methylenebis(4-cumyl-6-benzotriazolylphenol) | 2800 |
| Example 4 | 2,2'-Octylidenebis(4-methyl-(5'-methylbenzotriazolyl)phenol) | 2400 |
| Example 5 | 2,2'-Octylidenebis(4-methyl-(5'-chlorobenzotriazolyl)phenol) | 2500 |

The stabilizers of the invention clearly improve resistance of the lacquer coating to degradation by ultraviolet light far more than the control stabilizers, as shown by the hours to failure.

EXAMPLES 6 TO 10

Test specimens of lacquer coatings were prepared according to the same procedure as in Example 1, using a mixture of 70 parts of alkyl resin modified with coconut oil (Dainippon Ink & Chemicals Inc.: solids content 60%), 30 parts of butoxylated methylol melamine (Yuban 20 SE60) and 0.6 part of the stabilizer as shown in Table II, as a finishing lacquer. The coated sheets were exposed to ultraviolet light in a Weather-O-Meter. The time in hours when degradation set in, as determined by cracking on the surface of sheet, was noted as hours to failure, and the results are shown in Table II.

TABLE II

| Example No. | Stabilizer | Hours to Failure |
|---|---|---|
| Control 1 | None | 900 |
| Control 2 | 2-(2-Hydroxy-5-(1,1,3,3-tetramethylbutyl)phenyl)benzotriazole | 1400 |
| Control 3 | 2-(2-Hydroxy-3-t-butyl-5-methylphenyl)-5-chloro-benzotriazole | 1500 |
| Example 6 | 2,2'-Methylenebis(4-methyl-6-benzotriazolylphenol) | 2400 |
| Example 7 | 2,2'-Methylenebis(4-(1,1,3,3-tetramethylbutyl)-6-benzotriazolylphenol)) | 2600 |
| Example 8 | 2,2'-Methylenebis(4-cumyl-6-benzotriazolylphenol) | 2500 |
| Example 9 | 2,2'-Octylidenebis(4-methyl-(5'-methylbenzotriazolyl)phenol) | 2100 |
| Example 10 | 2,2'-Octylidenebis(4-methyl-(5'-chlorobenzotriazolyl)phenol) | 2200 |

The stabilizers of the invention clearly improve resistance of the lacquer coating to degradation by ultraviolet light far more than the control stabilizers, as shown by the hours to failure.

EXAMPLES 11 TO 15

Styrene 20 g, methyl methacrylate 20 g, butyl acrylate 20 g, 2-ethylhexyl methacrylate 22 g, 2-hydroxyethyl methacrylate 15 g, and methacrylic acid 3 g were polymerized in xylene using azobis-(isobutyronitrile) as a polymerization initiator, and an acrylic lacquer solution, solids content 50% was thus obtained.

This acrylic resin solution 14 parts was blended with butoxylated methylol melamine (Yuban 20 SE60) 5 parts, aluminum pigment (Alpaste 1123N) 6 parts, xylene 10 parts and 0.2 part of stabilizer as shown in Table III to form a finishing lacquer.

Pieces of steel sheeting, which were coated with a primer, were coated with this lacquer. The lacquer was sprayed on to a thickness of about 40μ, and aired for 10 minutes, and then the samples were stoved for 30 minutes at 140° C.

The coated sheets were exposed to ultraviolet light in a Weather-O-Meter for 3000 hours, and reflectances of the sheets before and after exposure were measured as 60° gloss. The results are shown in Table III as %.

TABLE III

| | | 60° gloss | |
|---|---|---|---|
| Example No. | Stabilizer | Original % | After exposure % |
| Control 1 | None | 92 | 9 |
| Control 2 | 2-(2-Hydroxy-5-methyl-phenyl)benzotriazole | 92 | 22 |
| Control 3 | 2-(2-Hydroxy-3,5-dicumyl-phenyl)benzotriazole | 93 | 31 |
| Example 11 | 2,2'-Methylenebis(4-methyl-6-benzotriazolylphenol) | 93 | 47 |
| Example 12 | 2,2'-Methylenebis(4-(1,1,3,3-tetramethylbutyl)-6-benzotriazolylphenol)) | 93 | 53 |
| Example 13 | 2,2'-Methylenebis(4-cumyl-6-benzotriazolylphenol) | 93 | 55 |
| Example 14 | 2,2'-Octylidenebis(4-methyl-(5'-methylbenzotriazolyl)phenol) | 92 | 51 |
| Example 15 | 2,2'-Octylidenebis(4-methyl-(5'-chlorobenzotriazolyl)phenol) | 93 | 51 |

The improvement when the stabilizer of the invention is used is remarkable, as compared to the controls, which were also benzotriazolyl phenols.

EXAMPLES 16 TO 20

Unsaturated polyester resin (Bayer; L/Ue6108) 75 parts, blocked polyisocyanate (Bayer; L/Ue6108) 25 parts, titanium dioxide 30 parts, copper phthalocyanine blue 1 part and 1 part of stabilizer as shown in Table IV were dispersed in a mixture of toluene 70 parts, xylene 80 parts, and butyl acetate 100 parts, to form a finishing lacquer.

Pieces of steel sheeting, which were coated with a primer, were coated with the lacquer. The lacquer was sprayed on to a thickness of about 30μ, and aired for 15 minutes, and then the samples were stoved for 30 minutes at 180° C.

The coated sheets were exposed to ultraviolet lighht in a Weather-O-Meter for 1000 hours. The reflectances of sheets before and after exposure were measured as 60° gloss, and the results are shown in Table IV as %.

TABLE IV

| | | 60° gloss | |
|---|---|---|---|
| Example No. | Stabilizer | Original % | After exposure % |
| Control 1 | None | 94 | 37 |
| Control 2 | 2-(2-Hydroxy-5-methyl-phenyl)benzotriazole | 93 | 44 |
| Control 3 | 2-(2-Hydroxy-3,5-dicumyl-phenyl)benzotriazole | 94 | 52 |
| Example 16 | 2,2'-Methylenebis(4-methyl-6-benzotriazolylphenol) | 94 | 68 |
| Example 17 | 2,2'-Methylenebis(4-(1,1,3,3-tetramethylbutyl)-6-benzotriazolylphenol)) | 95 | 71 |
| Example 18 | 2,2'-Methylenebis(4-cumyl-6-benzotriazolylphenol) | 94 | 70 |
| Example 19 | 2,2'-Octylidenebis(4-methyl-(5'-methylbenzotriazolyl)phenol) | 93 | 65 |
| Example 20 | 2,2'-Octylidenebis(4-methyl-(5'-chlorobenzotriazolyl)phenol) | 94 | 65 |

The improvement when the stabilizer of the invention is used is remarkable, as compared to the controls, which were also benzotriazolyl phenols.

Having regard to the foregoing disclosure, the following is claimed as the inventive and patentable embodiments thereof:

1. Thermosetting synthetic resin lacquer compositions having improved light stability comprising a thermosetting synthetic resin and an alkylidene bis(benzotriazolyl phenol) having the formula:

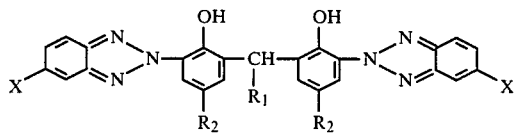

wherein:
$R_1$ is selected from the group consisting of hydrogen and alkyl having from one to about twelve carbon atoms;
$R_2$ is selected from the group consisting of alkyl having from one to about twelve carbon atoms, and arylalkyl having from seven to about sixteen carbon atoms;
X is selected from the group consisting of hydrogen, halogen, alkyl having from one to about twelve carbon atoms, aryl having from six to ten carbon artoms, arylalkyl having from seven to about sixteen carbon atoms, alkoxy having from one to about twelve carbon atoms, aryloxy having from six to ten carbon atoms and arylalkoxy having from seven to about sixteen carbon atoms.

2. A thermosetting synthetic resin lacquer composition according to claim 1 in which $R_1$ is hydrogen and $R_2$ is alkyl.

3. A thermosetting synthetic resin lacquer composition according to claim 1 in which $R_1$ and $R_2$ are each alkyl.

4. A thermosetting synthetic resin lacquer composition according to claim 1 in which $R_1$ is hydrogen and $R_2$ is arylalkyl.

5. A thermosetting synthetic resin lacquer composition according to claim 1 in which X is hydrogen.

6. A thermosetting synthetic resin lacquer composition according to claim 1 in which X is halogen.

7. A thermosetting synthetic resin lacquer composition according to claim 1 in which X is alkyl.

8. A thermosetting synthetic resin lacquer composition according to claim 1 in which X is aryl.

9. A thermosetting synthetic resin lacquer composition according to claim 1 in which X is arylalkyl.

10. A thermosetting synthetic resin lacquer composition according to claim 1 in which X is alkoxy.

11. A thermosetting synthetic resin lacquer composition according to claim 1 in which X is aryloxy.

12. A thermosetting synthetic resin lacquer composition according to claim 1 in which X is aryalkoxy.

13. A thermosetting synthetic resin lacquer composition according to claim 1 in which the alkylidene bis-benzotriazolyl phenol is 2,2'-methylenebis(4-methyl-6-benzotriazolylphenol).

14. A thermosetting synthetic resin lacquer composition according to claim 1 in which the alkylidene bis-benzotriazolyl phenol is 2,2'-methylenebis(4-(1,1,3,3-tetramethylbutyl)-6-benzotriazolylphenol)).

15. A thermosetting synthetic resin lacquer composition according to claim 1 in which the alkylidene bis-benzotriazolyl phenol is 2,2'-methylenebis(4-cumyl-6-benzotriazolylphenol).

16. A thermosetting synthetic resin lacquer composition according to claim 1 in which the alkylidene bis-benzotriazolyl phenol is 2,2'-octylidenebis(4-methyl-(5'-methylbenzotriazolyl)phenol).

17. A thermosetting synthetic resin lacquer composition according to claim 1 in which the alkylidene bis-benzotriazolyl phenol is 2,2'-octylidenebis(4-methyl-(5'-chlorobenzotriazolyl)phenol).

18. A thermosetting synthetic resin lacquer composition according to claim 1 in which the amount of alkylidene bis-benzotriazolyl phenol is within the range from about 0.001 to about 10 parts by weight, based on the solvent-free thermosetting resin.

19. A thermosetting synthetic resin lacquer composition according to claim 1 in which the amount of alkylidene-bis-benzotriazolyl phenol is within the range from about 0.01 to about 5 parts by weight, based on the solvent-free thermosetting resin.

20. A thermosetting synthetic resin lacquer composition according to claim 1 in which the thermosetting synthetic resin is an acrylic resin.

21. A thermosetting synthetic resin lacquer composition according to claim 1 in which the thermosetting synthetic resin is an alkyd resin.

22. A thermosetting synthetic resin lacquer composition according to claim 1 in which the thermosetting synthetic resin is an unsaturated polyester resin.

23. A thermosetting synthetic resin lacquer composition according to claim 1 in which the composition comprises another light stabilizer selected from the group consisting of UV absorbers of the benzophenone type, UV absorbers of the benzotriazole type, UV absorbers of the benzoate type, UV absorbers of the acrylate type, and UV absorbers of the oxanilide type.

24. A thermosetting synthetic resin lacquer composition according to claim 23 in which another light stabilizer compound is employed in an amount within the range from about 0.001 to about 5 parts by weight of the thermosetting resin.

* * * * *